United States Patent [19]

Lund

[11] 3,912,751

[45] Oct. 14, 1975

[54] 6-AMINOPENICILLANIC ACID DERIVATIVES, METHODS FOR PRODUCING AND COMPOSITIONS CONTAINING SAME

[75] Inventor: Frantz Johannes Lund, Lyngby, Denmark

[73] Assignee: Lovens Kemiske Fabrik Produktionsaktieselskab, Ballerup, Denmark

[22] Filed: Feb. 19, 1974

[21] Appl. No.: 443,191

[30] Foreign Application Priority Data
Feb. 27, 1973 United Kingdom................ 9592/73

[52] U.S. Cl......... 260/306.7 C; 260/239.1; 424/271
[51] Int. Cl.[2].................................. C07D 499/02
[58] Field of Search................... 260/239.1, 306.7 C

[56] References Cited
UNITED STATES PATENTS
3,198,804   1965   Johnson et al.................. 260/306.7

FOREIGN PATENTS OR APPLICATIONS
1,293,590   1972   United Kingdom............. 260/239.1

Primary Examiner—Gerald A. Schwartz

Attorney, Agent, or Firm—Jackson, Jackson and Chovanes

[57] ABSTRACT

New compounds of the general formula

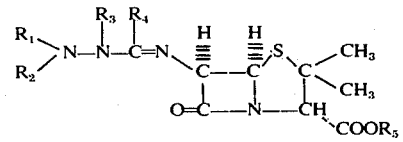

in which $R_1$, $R_2$, $R_3$ and $R_4$ represent an aliphatic hydrocarbon radical, a mono- or bicyclic aryl radical, an aralkyl radical, a cycloalkyl radical, a cycloalkylalkyl radical, a heterocyclic radical or a heterocyclically substituted alkyl radical; $R_1$ furthermore represents an acyl or unsubstituted or substituted carbamyl radical, in which case $R_2$ can also be hydrogen; each of the radicals $R_1$, $R_2$, $R_3$ and $R_4$ can together with one or more of the other radicals form a heterocyclic ring system; $R_1$ and $R_2$ together represent an alkylidene radical attached to the nitrogen atom with a double bond; $R_4$ and $R_5$ can also be hydrogen and $R_5$ can be unsubstituted or substituted alkyl or aralkyl radical.

The compounds of the invention possess valuable antibacterial activity and the toxicity is extremely low.

10 Claims, No Drawings

NEW 6-AMINOPENICILLANIC ACID DERIVATIVES, METHODS FOR PRODUCING AND COMPOSITIONS CONTAINING SAME

This invention relates to hitherto unknown derivatives of 6-aminopenicillanic acid, and to pharmaceutically acceptable salts thereof.

The compounds of the invention which are valuable in the human and veterinary practice, have the general formula:

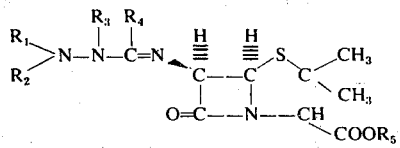

in which $R_1$, $R_2$, $R_3$ and $R_4$ represent an aliphatic hydrocarbon radical, a mono- or bicyclic aryl radical, an aralkyl radical, a cycloalkyl radical, a cycloalkylalkyl radical, a heterocyclic radical or a heterocyclically substituted alkyl radical; $R_1$ furthermore represents an acyl or unsubstituted or substituted carbamyl radical, in which case $R_2$ can also be hydrogen; each of the radicals $R_1$, $R_2$, $R_3$ and $R_4$ can together with one or more of the other radicals form a heterocyclic ring system; $R_1$ and $R_2$ together represent an alkylidene radical attached to the nitrogen atom with a double bond; $R_4$ and $R_5$ can also be hydrogen and $R_5$ can be an unsubstituted or substituted alkyl or aralkyl radical.

More particularly, $R_1$ to $R_4$ represent an aliphatic hydrocarbon radical in which the carbon chain can be straight or branched, saturated or unsaturated, e.g. methyl, ethyl, propyl, isopropyl, butyl, sec.butyl, tert-.butyl, pentyl, hexyl, dodecyl, allyl, butenyl, pentenyl, propargyl; a mono- or bicyclic aryl radical, e.g. a phenyl radical or a naphtyl radical; an aralkyl radical, such as mono- or bicyclic aralkyl radical, e.g. benzyl, phenylethyl, 1- or 2-naphthylmethyl; a cycloalkyl or cycloalkyl-alkyl radical, in which the cycloalkyl group can have from 3 to 10 ring members and can be saturated or have one or two double bonds, e.g. cyclopentyl, cyclohexyl, 1-adamantyl, 1-bicyclo (2.2.2)octyl, cyclopentenyl and cyclohexenyl, cyclopentylmethyl, cyclohexylmethyl, cyclopentenylethyl, cyclohexenylmethyl, etc; a heterocyclic radical or a heterocyclically substituted alkyl radical in which the heterocyclic part can have from 5 to 10 atoms in the ring and can contain oxygen, sulphur, and/or nitrogen atoms in all of which the hetero atoms may be placed in any of the available positions, and such heterocyclic radical optionally being more or less hydrogenated, e.g. pyridyl, pyrazinyl, pyrimidyl, pyrrolidyl, piperidyl, morpholinyl, pyrazolyl, pyrazolinyl, pyrazolidinyl, thiazinyl, furyl, thienyl, quinolyl; each of the radicals $R_1$ to $R_4$ can together with one or more of the other radicals represent heterocyclic radicals having from 5 to 8 ring atoms and optionally containing other hetero atoms in the ring, such as S, O and/or N, forming more or less hydrogenated ring systems e.g. pyrazolinyl, pyrazolidinyl, 1,2,3-,6-tetrahydropyridazinyl, 1,4,5,6-tetrahydropyridazinyl, hexahydropyridazinyl, piperidyl, morpholinyl, hexahydro-1H-azepin-1-yl, or hexahydro-1(2H)-azocinyl.

When $R_1$ represents acyl, it may in particular represent an aliphatic, alicyclic, aromatic, aralipatic or heterocyclic acyl radical, such as an acetyl, propionyl, butyryl, pivaloyl, cyclohexylacetyl, benzoyl, phenylacetyl, picolinyl, nicotinyl, furylacetyl or thienylacetyl radical. When $R_1$ represents a substituted carbamyl, the substituents are preferably lower alkyl.

The radicals $R_1$ to $R_4$ may be further substituted with halogen atoms, an alkyl, hydroxy, alkoxy, aryloxy, alkylthio, arylthio group, an acyl group, a carboxy, carbalkoxy, carbamyl, carbamido, cyano or sulfonyl group, an azido, amino- or substituted amino group.

More particularly, $R_5$ besides being hydrogen stands for an alkyl radical, e.g. a methyl or butyl radical, an aralkyl radical, e.g. a benzyl radical, a cycloalkyl or cycloalkyl-alkyl radical, e.g. a cyclopentyl or a cyclohexylmethyl radical, an alkyl radical substituted with halogen, alkoxy, alkanoyl, aroyl, cyano, or a carbalkoxy group, e.g. $\beta$, $\beta$, $\beta$-trichloroethyl, methoxymethyl, acetonyl, phenacyl, cyanomethyl, carbethoxymethyl, or dicarbethoxymethyl; $R_5$ further represents an acyloxymethyl radical the acyl part of which being e.g. an aliphatic, alicyclic, aromatic, ar-aliphatic or heterocyclic acyl radical, such as acetyl, propionyl, butyryl, pivaloyl, cyclohexylacetyl, benzoyl, phenylacetyl, picolinyl, nicotinyl, furylacetyl and thienylacetyl.

Further $R_5$ represents one of following radicals:

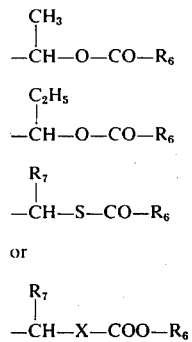

in which radicals $R_6$ represents aliphatic, cycloaliphatic, aryl, aralkyl, or heterocyclic radicals all of these radicals optionally being substituted by one or more radicals selected from the group consisting of nitro, azido, amino, substituted amino, such as methylamino, diethylamino, and acetamido, alkyl, trifluoroalkyl, halogen, alkoxy, aryloxy, alkylthio and arylthio radicals;

$R_7$ represents hydrogen, methyl or ethyl;

X represents —O—, —NH— or —S—.

As examples of radicals falling within the above definitions and the definitions used in the present specification, mention may especially be made of:

alkyl: methyl, ethyl, propyl, isopropyl, butyl, isobutyl, tert-butyl, pentyl, hexyl, heptyl, octyl and 2-ethylhexyl; cycloalkyl: cyclopropyl, cyclobutyl, cyclopentyl, cyclohexyl and cycloheptyl; cycloalkyl-alkyl:

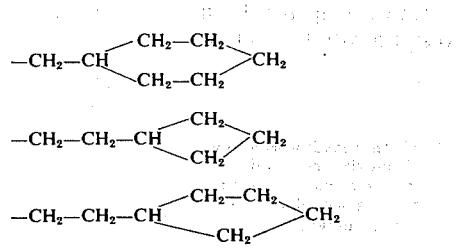

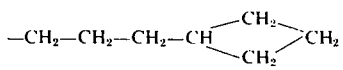

alkoxy: methoxy, ethoxy, propyloxy, isopropyloxy, butoxy and isobutoxy;
halogen: fluorine, chlorine and bromine;
aryl: phenyl, tolyl, naphthyl;
aralkyl: benzyl, phenethyl and naphthylmethyl;
alkylthio: methylthio, ethylthio and butylthio; heterocyclic radicals:

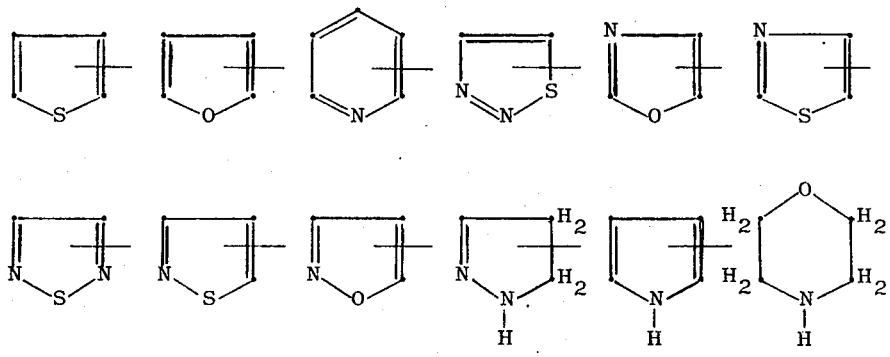

Whenever the expression "lower" is used in the foregoing and in the following in connection with an organic radical it indicates a content of from 1 to 6 atoms.

The compounds of formula I may be isolated as such or in the form of a salt with a pharmaceutically acceptable acid, such as hydrochloric acid, phosphoric acid, nitric acid, p-toluenesulfonic acid, acetic acid, propionic acid, citric acid, tartaric acid, maleic acid, etc. When $R_5$ stands for hydrogen the compounds of formula I may be isolated as the zwitterion or as a salt, e.g. the alkali metal salts and the ammonium or amine salts, or salts with strong acids, such as hydrochloric acid or methanesulfonic acid.

The invention comprises all possible isomeric forms of the compounds of formula I, depending on the different substituents, whereas the 6-aminopenicillanic acid moiety has the configuration of that obtained by the fermentation process.

The compounds of the invention possess valuable antibacterial activity and the toxicity is extremely low.

The antibacterial effect of the compounds of the invention has been shown to be quite different from the effect of the previously known amidinopenicillanic acid derivatives, e.g. as described in British Patent No. 1,293,590. Thus, there is a difference in the activity of the previously known derivatives against resistant and non-resistant coli bacilli of about 1000 times, whereas the present compounds are equally active against resistant and non-resistant coli.

The activity against resistant coli bacilli, has been determined e.g. against Escherichia coli HA 2/FL 1060, Leo strain with the following results:

|   | Concentration required for 50% inhibition, (µg/ml) |
|---|---|
| 6-[(N-(hexahydro-1H-azepin--1-yl)-ethylamino)-methyleneamino]-penicillanic acid (a compound according to the present invention) | 1.5 |
| 6-[(hexahydro-1H-azepin-1-yl)-methyleneamino]-penicillanic acid (a compound according to British Patent No. 1,293,590) | 16 |

Further, no cross resistance has been shown between the present compounds and the previously known amidinopenicillanic acid derivatives, e.g. as described in the above mentioned British patent.

For certain medical purposes it will be advantageous to use the free acids or their salts, whereas it for other purposes will be more favourable to use the easily hydrolyzable esters, which in the organism will be chemically or enzymatically hydrolyzed to the corresponding free acids. In other cases the less hydrolyzable esters will be preferred in order to obtain particular distribution in the body.

For instance in some cases the afore-mentioned acyloxyalkyl esters of formula I are absorbed more efficiently after oral administration than the corresponding free acids. After the absorption these esters are hydrolyzed under the influence of enzymes present in blood and tissues with liberation of the corresponding free acids, which generally have a more pronounced antibacterial activity than the esters.

The invention also comprises methods for the preparation of the above described compounds. In one method the compounds are prepared by reacting a 6-aminopenicillanic acid derivative of the general formula II:

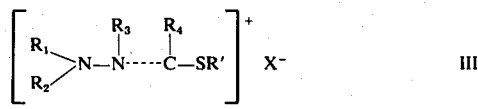

in which $R_5'$ is as defined above for $R_5$ or stands for a trialkylsilyl radical, e.g. a trimethylsilyl radical, with a compound of the formula III:

$$\left[ \begin{matrix} R_1 \\ R_2 \end{matrix} \!\!> \!\! N-N \!\! \begin{matrix} R_3 & R_4 \\ | & | \\ \cdot\cdot\cdot\cdot C-SR' \end{matrix} \right]^+ X^- \qquad III$$

in which $R_1$, $R_2$, $R_3$ and $R_4$ are as defined above, $R'$ is a lower alkyl radical and X is a "good leaving group", $X^-$ thus standing for $Cl^-$, $Br^-$, $I^-$, $CH_3SO_4^-$, $BF_4^-$, and $CF_3SO_3^-$, or another suitable anion. The reaction is performed in an inert organic solvent such as chloroform and preferably in the presence of one or two equivalents of a tertiary amine, e.g. trimethylamine, triethylamine, N,N-diisopropylethylamine or N-methylmorpholine.

In case that $R_5'$ in the starting material of formula II is hydrogen, the final compounds of formula I are produced in the form of their zwitterions. If $R_5'$ stands for a trialkylsilyl radical, then the free acids of formula I are obtained directly or after an alcoholysis.

The reaction may be performed at or below room temperature but usually under cooling, and the reaction mixture is in most cases left standing overnight. The reaction product of formula I is isolated by well-known methods.

The compounds of formula III are new compounds and are prepared by thioacylating in known manner a hydrazine of the formula IV:

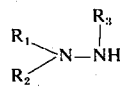

IV in which $R_1$, $R_2$ and $R_3$ are as defined above, to form a reaction product of the general formula V:

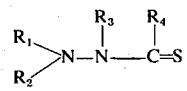

V in which $R_1$, $R_2$, $R_3$ and $R_4$ are as defined before. This product is alkylated by treatment with an alkylating agent of the formula $R' - X$, in which $R'$ and $X$ are as defined above, in a suitable solvent, e.g. ether, acetone, or alcohols at about room temperature or at slightly elevated temperatures and the reaction product of formula III is isolated in known manner.

In another method, the compounds of the invention are prepared by reacting the hydrazine of formula IV with a reactive derivative of a 6-acylamino-penicillanic acid ester. Such a reactive derivative is for instance obtained by reacting a compound of formula VI:

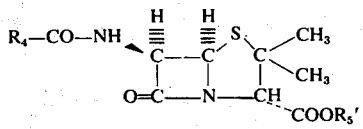

VI in which $R_4$ and $R_5'$ are as defined before except that $R_5'$ cannot be hydrogen, with a halogenating agent, e.g. phosphorous pentachloride, in the presence of a tertiary organic base, for instance quinoline. The reaction is performed without isolation of the intermediate formed by the process, which in the example mentioned above is supposed to be an imide chloride of the compound of formula VI. The reactions are performed below or at room temperature and in the presence of an inert solvent, e.g. chloroform. As another reactive derivative of the compounds of formula VI an imido ester can be mentioned, which can be prepared by reacting the imide halogenide mentioned above with a lower aliphatic alcohol in the presence of a tertiary organic amine, e.g. triethylamine.

In another embodiment of this method, the compounds of formula I in which $R_4$ is hydrogen are prepared by reacting a 6-aminopenicillanic acid derivative of the above formula II with a compound of the formula VII:

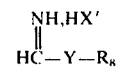

VII in which $X'$ is a halogen atom, preferably chlorine, Y is an oxygen or a sulphur atom, and $R_8$ is a lower alkyl or a benzyl radical, thereby forming a reactive derivative of a compound of formula VI, said reactive derivative having the formula VIII:

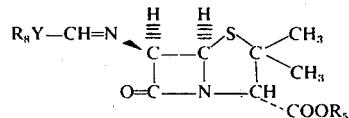

VIII in which $R_5$, $R_8$, and Y have the above meanings. Without isolation of the reaction product of formula VIII, a hydrazine of the above formula IV is added to the reaction mixture, whereby a compound of formula I is obtained. The reaction is preferably performed in an inert organic solvent, such as diethyl ether, tetrahydrofuran, diethylene glycol dimethyl ether, or benzene at or below room temperature. The first part of the reaction proceeds rapidly and after the addition of the hydrazine of the formula IV, the reaction mixture is placed at or below room temperature until the reaction has finished.

The starting materials of formulae II, IV, VI and VII are known or can be prepared by conventional methods for preparing analogous known compounds.

The reaction products of formula I can be purified and isolated in usual manner and may be obtained either in the free state or in the form of a salt.

The free acid ($R_5$=H) can, in addition to the methods described before, be obtained from some of the esters by an enzymatic hydrolysis or a mild hydrogenolysis of preferably the benzyl esters using a noble metal catalyst such as a palladium-on-carbon catalyst, and if the free acid is the reaction product, the esters can be prepared therefrom by esterification methods known from the literature.

It is a further object of the present invention to provide pharmaceutical compositions which are useful in the treatment of infectious diseases in the human and veterinary practice.

With this object in view, the compositions of the invention contain as an active component at least one member selected from the group consisting of compounds of the formula I and salts thereof with non-toxic, pharmaceutically acceptable acids and bases (the latter in case $R_5$=hydrogen), together with solid or liquid pharmaceutical carriers and/or diluents.

In the said compositions, the proportion of therapeutically active material to carrier substance can vary between 1% and 95% by weight. The compositions can be worked up to various pharmaceutical forms of presentation, such as tablets, pills, dragees, suppositories, capsules, sustained-release tablets, suspensions, injection medicine and the like containing the compounds of formula I or their atoxic salts, mixed with carriers and/or diluents.

Pharmaceutical organic or inorganic, solid or liquid carriers and/or diluents suitable for oral, enteral or parenteral administration can be used to make up compositions containing the present compounds. Gelatine, lactose, starch, magnesium stearate, talc, vegetable and animal fats and oils, gum, polyalkylene glycol, buffers or other known carriers and/or diluents for medicaments are all suitable.

The preferred salt of the compounds of formula I is the hydrochloride, but salts with other inorganic or organic acids including antibiotically active acids may be used, e.g. the phosphate, the acetate or the phenoxymethylpenicillinate. Furthermore, the compositions may contain other pharmaceutically active components which can appropriately be administered together with the ester in the treatment of infectious diseases, such as other suitable antibiotics.

The free acids of formula I, as such or in the form of their salts in buffered solutions, are generally administered parenterally, whereas the easily hydrolyzable esters included in formula I are never given parenterally but preferably orally or in another suitable manner.

As indicated above, the compounds of formula I and their salts may be worked up to pharmaceutical forms of presentation including suspensions and non-aqueous ointments and creams. A pharmaceutical preparation for oral treatment may be in the form of a suspension of a compound of formula (I) as such or in the form of a sparingly soluble salt with a pharmaceutically acceptable acid, the preparation containing from 20 to 100 mg per ml of a non-aqueous vehicle. A pharmaceutical preparation for topical treatment may be in the form of a non-aqueous ointment or cream containing a compound of formula (I) in an amount of from ½ to 10 g per 100 g of preparation.

Another object of the invention resides in the selection of a dose of the compounds of the invention which dose can be administered so that the desired activity is achieved without simultaneous secondary effects. In human therapy, the compounds and their salts are conveniently administered (to adults) in dosage units containing not less than 50 mg and up to 1000 mg, preferably from 250 to 750 mg, calculated as the compound of formula I.

By the term "dosage unit" is meant a unitary, i.e. a single dose which is capable of being administered to a patient, and which may be readily handled and packed, remaining as a physically stable unit dose comprising either the active material as such or a mixture of it with solid or liquid pharmaceutical diluents or carriers.

In the form of a dosage unit, the compound may be administered once or more times a day at appropriate intervals, always depending, however, on the condition of the patient, and in accordance with the prescription made by the medical practitioner.

Thus a daily dose will preferably be an amount of from 1 to 3 g of a compound of formula I.

If the composition is to be injected, a sealed ampoule, a vial or a similar container may be provided containing a parenterally acceptable aqueous or oily injectable solution or dispersion of the active material as the dosage unit.

The parenteral preparations are in particular useful in the treatment of conditions in which a quick response to the treatment is desirable. In the continuous therapy of patients suffering from infectious diseases, the tablets or capsules may be the appropriate form of pharmaceutical preparation owing to the prolonged effect obtained when the drug is given orally, in particular in the form of sustained-release tablets.

In the treatment of infectious diseases, such tablets may advantageously contain other active components, as mentioned hereinbefore.

Still another object of the invention is to provide a method of treating patients suffering from infectious diseases, the method comprising administering to adult patients from 0.5 g to 5 g per day, preferably from 1 to 3 g per day, of a compound of the formula I or an equivalent amount of a salt as defined before of a compound of the formula I. Preferably, the compound is given in the form of the dosage units aforesaid.

The invention will be further described in the following Examples which are not to be construed as limiting the invention.

EXAMPLE 1

Pivaloyloxymethyl 6-trimethylhydrazinomethyleneaminopenicillanate nitrate

To a solution of pivaloyloxymethyl 6-aminopenicillanate (6.6 g) in dry ether (100 ml) was added isopropyl formimidate hydrochloride (2.5 g). The suspension was stirred for 20 minutes at room temperature. After cooling with ice-water trimethylhydrazine (1.5 g) was added. The reaction mixture was kept at 0°–5°C for 16 hours and filtered. The filtrate was extracted with diluted hydrochloric acid (100 ml) at a pH of about 2.5. The aqueous phase was made alkaline with sodium bicarbonate and extracted with ethyl acetate (100 ml), which was dried over magnesium sulfate.

After removal of the solvent in vacuo the residue was redissolved in ether (75 ml), filtered again, and the filtrate evaporated in vacuo. The oily residue was taken up in ethanol (20 ml) and a solution of concentrated nitric acid (0.5 ml) in isopropanol (5 ml) was added at 0°C followed by ether (about 50 ml). The crystalline precipitate was isolated and melted at 159°–160°C. A recrystallization from ethanol/diisopropyl ether gave an analytically pure product with a melting point of 161.5°–162°C.

$[\alpha]_D^{20}$: + 197° ($c$=1, 96% v/v ethanol)

EXAMPLE 2

Pivaloyloxymethyl 6-[(N-allyl-N', N'-dimethylhydrazino)-methyleneamino]-penicillanate nitrate Pivaloyloxymethyl 6-aminopenicillanate (3.3 g) and isopropyl formimidate hydrochloride (1.25 g) were stirred in dry ether (50 ml) for half an hour at room temperature. At 0°–5°C N-allyl-N',N'-dimethylhydrazine (1 g) was added. The mixture was left for 16 hours at this temperature. After filtration the filtrate was extracted with diluted hydrochloric acid (50 ml) at pH ≈ 2–3. The aqueous phase was made alkaline with sodium bicarbonate and extracted with ether (75 ml). After drying, the ethereal phase was evaporated in vacuo. The residue was dissolved in ether (25 ml) and the nitrate precipitated by the addition of a solution of concentrated nitric acid (0.2 ml) in ethanol (5 ml). The precipitate was recrystallized from acetone-ether and from isopropanol yielding the analytically pure product with a melting point of 156.5°–157°C.

$[\alpha]_D^{20}$: + 182° ($c$=1, 96% v/v ethanol).

EXAMPLE 3

Pivaloyloxymethyl 6-[(N-benzyl-N',N'-dimethylhydrazino)-methyleneamino]-penicillanate oxalate A. N-Benzyl-N',N'-dimethylthioformohydrazide A solution of ethyl thioformate (2.5 g) in dry ether (5 ml) was slowly added to a solution of N-benzyl-N',N'-dimethylhydrazine (4.1 g) in ether (40 ml) at 0°–5°C with stirring. The solution was kept at room temperature for 64 hours and extracted with 1 N hydrochloric acid (50 ml) and water (50 ml) at 0°–5°C. After drying, the ether was removed in vacuo.

B. N-Benzyl-N',N',S-trimethylthioformohydrazidium iodide

The crude product (2 g) and methyl iodide (0.95 ml) were dissolved in ether (50 ml) and kept 16 hours at room temperature to precipitate a crude product which was used in the next step without purification.

C. Pivaloyloxymethyl 6-[(N-benzyl-N',N'-dimethylhydrazino)-methyleneamino]-penicillanate oxalate Pivaloyloxymethyl 6-aminopenicillanate hydrochloride (1.45 g) and N,N-diisopropylethylamine (2 ml) were dissolved in dry chloroform (30 ml). The above-mentioned crude product (1.3 g) was added and the reaction mixture kept in an ice-box overnight. After evaporation in vacuo the residue was triturated with ether (50 ml). The precipitate was filtered off and the filtrate extracted with diluted hydrochloric acid (30 ml pH ≈ 2). The aqueous phase was made alkaline with sodium bicarbonate and extracted with ether (50 ml) which was dried and evaporated in vacuo. The residue was dissolved in acetone (10 ml). Addition of a solution of anhydrous oxalic acid in acetone precipitated the salt which was recrystallized from acetone. The analytically pure compound had a melting point of 145°C. $[\alpha]_D^{20}$: + 174° ($c$=1, 96% v/v ethanol).

EXAMPLE 4

Pivaloyloxymethyl 6-[(N'-acetyl-N-isopropylhydrazino)-methyleneamino]-penicillanate To a suspension of pivaloyloxymethyl 6-aminopenicillanate p-toluenesulfonate (11 g) in dry benzene (100 ml) was added 3.45 ml of N,N-diisopropylethylamine with stirring. To the resulting solution propyl formimidate hydrochloride (2.8 g) was added, and the reaction mixture was stirred for half an hour at room temperature. The solvent was removed in vacuo and the residue was triturated with ether (100 ml). The solid formed was removed by filtration. N'-Isopropylacetohydrazide (2.4 g) was added to the filtrate which was kept at room temperature for 48 hours and then extracted with diluted hydrochloric acid (50 ml pH ≈ 2). The aqueous phase was made alkaline with sodium bicarbonate and extrated with ether (75 ml). The ether was removed in vacuo and the residue crystallized by trituration with water. After a recrystallization from di-n-butyl ether, the melting point was 90°–100°C. The crude product was dissolved in diluted hydrochloric acid (50 ml, pH ≈ 2) and extracted with methylene chloride and ether. The aqueous phase was made alkaline with sodium bicarbonate and taken up in ether which was removed in vacuo. The residue was triturated with water to yield the analytically pure compound with a melting point of 103°–104°C. $[\alpha]_D^{20}$: + 197° ($c$=1, 96% v/v ethanol).

EXAMPLE 5

Pivaloyloxymethyl 6-[(N'-carbamyl-N,N'-dimethylhydrazino)-methyleneamino]-penicillanate A solution of pivaloyloxymethyl 6-aminopenicillanate p-toluenesulfonate (15 g) and N,N-diisopropylethylamine (5.15 ml) in dry benzene (150 ml) was treated with propyl formimidate hydrochloride (4.2 g) as in Example 4. The benzene was removed in vacuo and the residue triturated with ether. After filtration the ether was removed in vacuo. The residue (8 g) was dissolved in tetrahydrofuran (150 ml). 1,2-Dimethylsemicarbazide (2.1 g) was added and the resulting solution kept at room temperature for 20 hours. The solvent was removed in vacuo and the residue triturated with ether. After filtration the filtrate was extracted with diluted hydrochloric acid (50 ml, pH ≈ 2). The aqueous phase was made alkaline with sodium bicarbonate. The crystalline precipitate thereby formed was recrystallized from ethyl acetate -petroleum ether to yield the analytically pure compound with a melting point of 151°–151.5°C.

$[\alpha]_D^{20}$: + 140° ($c$=1, 96% v/v ethanol).

EXAMPLE 6

Pivaloyloxymethyl 6-[(5-methyl-2-pyrazolin-1-yl)-methyleneamino]-penicillanate Pivaloyloxymethyl 6-aminopenicillanate (3.3 g) and isopropyl formidate hydrochloride (1.25 g) were stirred in dry ether (50 ml) for half an hour at room temperature. At 0°–5°C 5-methyl-2-pyrazoline (0.85 g) was added. The mixture was left for 40 hours at this temperature. After filtration, the filtrate was evaporated in vacuo. The residue was taken up in ether and extracted with diluted hydrochloric acid at pH ≈ 2–3. The aqueous phase was made alkaline with sodium bicarbonate and extracted with ether. The ethereal phase was dried and evaporated in vacuo to leave an oil which did not crystallize. According to the NMR spectrum (10% w/v CDCl$_3$) the product consists of a 1:1 mixture of two stereo- or rotationisomers:

| | | | | |
|---|---|---|---|---|
| C(CH$_3$)$_3$ | 18 H | s | at | 1.23 |
| N—CH—CH$_3$ | 6 H | d | at | 1.36 (J=6) |
| C$_{(2)}$(CH$_3$)$_2$ | 6 H | s | at | 1.51 |
| | 3 H | s | at | 1.65 |
| | 3 H | s | at | 1.69 |
| N=CH—CH$_2$ | 4 H | m | at | 2.5–3.5 |
| N—CH—CH$_3$ | 2 H | m | at | 4.0–4.8 |
| C$_{(3)}$H | 1 H | s | at | 4.42 |
| | 1 H | s | at | 4.45 |
| C$_{(6)}$H | 1 H | bd | at | 5.07 (J=5) |
| | 1 H | bd | at | 5.15 (J=5) |
| C$_{(5)}$H | 2 H | d | at | 5.55 (J=5) |
| OCH$_2$O | 4 H | ABq | d  at | 5.80 (J=5) |
| | | | d  at | 5.92 (J=5) |
| N—N=CH—CH$_2$ | 2 H | m | at | 6.78 |
| N—CH=N | 1 H | bs | at | 8.27 |
| | 1 H | bs | at | 8.40 |

In this and the following Examples the chemical shifts are given as ppm in δ values with TMS (0 ppm) as internal standard. Coupling constants (J) are in cps.

EXAMPLE 7

Pivaloyloxymethyl
6-[(N-(hexahydro-1H-azepin-1-yl)-ethylamino)-
methyleneamino]-penicillanate A. Hexahydro-1-(methyleneamino)-1H-azepine Formalin (44 ml) was slowly added to 1-aminohexahydro-1H-azepine (38 ml) with stirring at 20°–30°C. The mixture was stirred for 3 hours at room temperature and saturated with solid sodium hydroxide with cooling. The organic phase was separated, dried over magnesium sulfate and distilled. The boiling point was 68°–69°C/10 mm Hg.

B. 1-(Ethylamino)hexahydro-1H-azepine hydrochloride

To the Grignard reagent prepared from magnesium (3.6 g) and methyl iodide (9.2 ml) in dry dibutyl ether (20 ml), the above-mentioned product (14.8 g) in dibutyl ether (15 ml) was slowly added with stirring at 50°–60°C. The mixture was stirred at 85°–90°C for 2 hours. The next day the mixture was poured on concentrated hydrochloric acid (25 ml) and ice (125 g). The aqueous phase was separated and concentrated in vacuo. Concentrated sodium hydroxide solution (40 ml) was added with stirring and cooling. The mixture was extracted with ether (3 × 100 ml). The organic phase was dried and distilled to yield the compound with a boiling point of 65°–66°C/10 mm Hg.

This compound (9.6 g) was dissolved in ether (150 ml). At 0°–5°C, hydrogen chloride in isopropanol (8 N, 8.5 ml) was added to yield the pure hydrochloride with a melting point of 126°–127°C.

C. Pivaloyloxymethyl 6-[(N-(hexahydro-1H-azepin-1-yl)-ethylamino)-methyleneamino]-penicillanate Pivaloyloxymethyl 6-aminopenicillanate (6.6 g) and propyl formimidate hydrochloride (2.8 g) were stirred in dry ether (100 ml) for half an hour at room temperature. At 0°–5°C, 1-(ethylamino)hexahydro-1H-azepine (2.8 g) (liberated from a solution of the hydrochloride in methanol by neutralization with sodium methoxide followed by removal of the solvent in vacuo and extraction with ether) was added. The mixture was left at this temperature during the night.

The reaction mixture was extracted twice with water and finally with diluted hydrochloric acid (pH ≈ 2). The last extract was made alkaline with sodium bicarbonate and extracted with ether. The etheral phase was extracted with diluted hydrochloric acid (50 ml). The aqueous phase was extracted with methylene chloride (2 × 50 ml) and the organic phase was dried and evaporated in vacuo. The residue was treated with charcoal (30 mg) in petroleum ether (30 ml) and the filtrate was evaporated in vacuo. The residue did not crystallize.

NMR spectrum (10% w/v CDCl₃):

| | | | | |
|---|---|---|---|---|
| $\underline{CH_3}CH_2N$ | 3 H | t | at | 1.22 (J=7) |
| $\underline{C(CH_3)_3}$ | 9 H | s | at | 1.23 |
| $C_{(2)}(CH_3)_2$ | 3 H | s | at | 1.51 |
|  | 3 H | s | at | 1.65 |
| $CH_2CH_2CH_2CH_2$ | 8 H | m at about 1.60 | | |
| $CH_2NCH_2$ | 4 H | m at about 3.0 | | |
| $CH_3\underline{CH_2}N$ | 2 H | m at about 3.40 | | |
| $C_{(3)}H$ | 1 H | s | at | 4.42 |
| $C_{(6)}H$ | 1 H | bd | at | 5.06 (J=5) |
| $C_{(5)}H$ | 1 H | d | at | 5.50 (J=5) |
| $OCH_2O$ | 2 H | ABq | d | 5.77 (J=5.5) |
|  |  |  | d | 5.90 (J=5.5) |
| N—CH=N | 1 H | bs | at | 7.80 |

EXAMPLE 8

Pivaloyloxymethyl
6-[(N-piperidinoethylamino)-methyleneamino]-
penicillanate

A. 1-(methyleneamino)piperidine

By following the procedure of Example 7 (A) and replacing 1-aminohexahydro-1H-azepine by 1-aminopiperidine the compound was obtained with a boiling point of 44°–46°C/10 mm Hg.

B. 1-(Ethylamino)piperidine hydrochloride

By following the procedure of Example 7 (B) and replacing hexahydro-1-(methyleneamino)-1H-azepine by 1-(methyleneamino)piperidine the hydrazine was obtained with a boiling point of 44°–45°C/10 mm Hg. The melting point of the hydrochloride was 141°–142°C.

C. Pivaloyloxymethyl 6-[(N-piperidinoethylamino)-methyleneamino]-penicillanate

By following the procedure of Example 7 (C) and replacing 1-(ethylamino)hexahydro-1H-azepine by 1-(ethylamino) piperidine, the compound was obtained as an oil which did not crystallize.

EXAMPLE 9

Pivaloyloxymethyl
6-[(N-ethyl-N',N'-dipropylhydrazino)-
methyleneamino]-penicillanate A. Formaldehyde dipropylhydrazone By following the procedure of Example 7 (A) and replacing 1-aminohexahydro-1H-azepine by N,N-dipropylhydrazine, the compound was obtained with a boiling point of 44°–46°C/10 mm Hg.

B. N-Ethyl-N',N'-dipropylhydrazine

By following the procedure of Example 7 (B) and replacing hexahydro-1-(methyleneamino)-1H-azepine by formaldehyde dipropylhydrazone, the hydrazine was obtained with a boiling point of 45°–50°C/10 mm Hg.

C. Pivaloyloxymethyl 6-[(N-ethyl-N',N'-dipropylhydrazino)-methyleneamino]-penicillanate By following the procedure of Example 7 (C) and replacing 1-(ethylamino)hexahydro-1H-azepine by N-ethyl-N',N'-dipropylhydrazine, the compound was obtained as an oil which did not crystallize.

EXAMPLE 10

Acetoxymethyl
6-[(N-ethyl-N',N'-dibutylhydrazino)-
methyleneamino]-penicillanate A. Formaldehyde dibutylhydrazone By following the procedure of Example 7 (A) and replacing 1-aminohexahydro-1H-azepine by N,N-dibutylhydrazine the compound was obtained with a boiling point of 89°–92°C/20 mm Hg.

B. N-Ethyl-N',N'-dibutylhydrazine

By following the procedure of Example 7 (B) and replacing hexahydro-1-(methyleneamino)-1H-azepine by formaldehyde dibutylhydrazone the hydrazine was obtained with a boiling point of 82°–86°C/15–18 mm Hg.

C. Acetoxymethyl 6-[(N-ethyl-N',N'-dibutylhydrazino)-methyleneamino]-penicillanate By following the procedure of Example 7 (C) and replacing 1-(ethylamino)hexahydro-1H-azepine by N-ethyl-N',N'-dibutylhydrazine and pivaloyloxymethyl 6-aminopenicillanate with acetoxymethyl 6-aminopenicillanate, the compound was obtained as an oil.

EXAMPLE 11

1'-Ethoxycarbonyloxyethyl 6-trimethylhydrazinomethyleneaminopenicillanate

By following the procedure of Example 1 and replacing pivaloyloxymethyl 6-aminopenicillanate by 1'-ethoxycarbonyloxyethyl 6-aminopenicillanate, the compound was obtained as an oil.

EXAMPLE 12

Benzyl 6-[(N-allyl-N',N'-dimethylhydrazino)-methyleneamino]-penicillanate hydrochloride By following the procedure of Example 2 and replacing pivaloyloxymethyl 6-aminopenicillanate by benzyl 6-aminopenicillanate, the compound was obtained as an amorphous powder.

EXAMPLE 13

Butyl 6-[(2-methylpyrazolidin-1-yl)-methyleneamino]-penicillanate

By following the procedure of Example 6 and replacing pivaloyloxymethyl 6-aminopenicillanate by butyl 6-aminopenicillanate and 5-methyl-2-pyrazoline with 1-methylpyrazolidine, the compound was obtained as an oil which did not crystallize.

EXAMPLE 14

Pivaloyloxymethyl 6-(α-trimethylhydrazino-β-phenylethylideneamino)-penicillanate A. N,N',N'-Trimethylphenylthioacetohydrazide hydrochloride Carboxymethyl dithiophenylacetate (17.9 g) was stirred with ice-water (40 ml) and 2 N sodium hydroxide (37.5 ml) at 0°–5°C. To the filtered solution, trimethylhydrazine (6.5 g) was added. The mixture was stirred for 2 hours at room temperature. The precipitate formed was sucked off, washed with water, and air-dried. The melting point was 62°–64°C. The hydrochloride was prepared by dissolving this product (4.2 g) in ether (350 ml) and adding hydrogen chloride in isopropanol (2.5 ml, 8 N). It was recrystallized from ethanol-ether. The melting point was 154°–155°C.

B. N,N',N'-S-Tetramethylphenylthioacetohydrazidium iodide

This compound was prepared from methyl iodide (1.9 ml) and N,N',N'-trimethylphenylthioacetohydrazide (4.2 g) in ether at room temperature. The crude product was used in the next step (cp. Example 3(B))

C. Pivaloyloxymethyl 6-[α-trimethylhydrazino-β-phenylethylideneamino]-penicillanate This compound was prepared by following the procedure of Example 3 (C) and replacing N-benzyl-N',N',S-trimethylthioformohydrazidium iodide by N,-N'N'S-tetramethylphenylthioacetohydrazidium iodide. The product was an oil which did not crystallize.

EXAMPLE 15

Pivaloyloxymethyl 6-(α-trimethylhydrazino-2-thenylideneamino)-penicillanate

By following the procedure of Example 14 and replacing carboxymethyl dithiophenylacetate by carboxymethyl 2-thiophenedithiocarboxylate, the product was obtained as an oil.

EXAMPLE 16

Pivaloyloxymethyl 6-(α-trimethylhydrazino-p-chlorobenzylideneamino)-penicillanate By following the procedure of Example 14 and replacing carboxymethyl dithiophenylacetate by carboxymethyl p-chlorodithiobenzoate, the product was obtained.

EXAMPLE 17

Pivaloyloxymethyl 6-[(N'-phenylacetyl-N-isopropylhydrazino)-methyleneamino]-penicillanate Pivaloyloxymethyl 6-aminopenicillanate (6.6 g) and N'-isopropylphenylacetohydrazide (3.9 g) were stirred in dry ether (200 ml) for 10 minutes at 0°–5°C. Propyl formimidate hydrochloride (2.8 g) was added and the mixture was stirred for 3 hours at 0°–5°C and kept in the ice box for 16 hours. Thereupon the mixture was stirred for 24 hours at room temperature and extracted with 0.05 N hydrochloric acid (2 × 200 ml). The acidic aqueous phase was treated with charcoal and extracted with ethyl acetate (2 × 100 ml). The organic phase was treated with charcoal, dried and evaporated in vacuo to leave an amorphous powder which was taken up in ether (100 ml) and extracted with 20% aqueous sodium bicarbonate (2 × 100 ml). The ethereal phase was treated with charcoal, dried and evaporated in vacuo. The residue did not crystallize. NMR spectrum (10% w/v CD$_3$OD):

| | | | | |
|---|---|---|---|---|
| CH(CH$_3$)$_2$ | 6 H | d | at | 1.10 (J=7) |
| C(CH$_3$)$_3$ | 9 H | s | at | 1.20 |
| C$_{(2)}$(CH$_3$)$_2$ | 3 H | s | at | 1.51 |
| | 3 H | s | at | 1.65 |
| ⌬—CH$_2$ | 2 H | s | at | 3.60 |
| CH(CH$_3$)$_2$ | 1 H | m | at | 4.15 |
| C$_{(3)}$H | 1 H | s | at | 4.40 |
| C$_{(6)}$H | 1 H | dd | at | 5.13 (J=4.5) |
| C$_{(5)}$H | 1 H | d | at | 5.50 (J=4.5) |
| OCH$_2$O | 2 H | ABq | d | at 5.79 (J=5.5) |
| | | | d | at 5.92 (J=5.5) |
| ⌬ | 5 H | s | at | 7.32 |
| N—CH=N | 1 H | d | at | 7.70 (J=1) |

EXAMPLE 18

Pivaloyloxymethyl 6-(α-trimethylhydrazino-β-phenoxyethylideneamino)-penicillanate A. Pivaloyloxymethyl phenoxymethylpenicillinate To a suspension of potassium phenoxymethylpenicillinate (19.5 g) in acetone (200 ml), chloromethyl pivalate (8.3 ml) was added followed by 25% aqueous sodium iodide (5ml). The mixture was refluxed for 5 hours and thereafter evaporated in vacuo. The residue was taken up in ethyl acetate (250 ml) and extracted with ice-water (50 ml), icecold 2% aqueous sodium bicarbonate (2 × 50 ml) and finally with ice-water (2 × 50 ml). After drying, the organic phase was evaporated to leave an oil which did not crystallize.

B. Pivaloyloxymethyl 6-(α-trimethylhydrazino-β-phenoxyethylideneamino)-penicillanate To a stirred solution of phosphorus pentachloride (4.2 g) in dry, alcohol-free chloroform (40 ml), quinoline (4.6 ml) and, after cooling to −10°C, pivaloyloxymethyl phenoxymethylpenicillinate (8 g) were added. After stirring for 15 minutes at −10°C, the solution was poured on an icecold saturated aqueous solution of sodium bicarbonate (300 ml) with vigorous stirring. After stirring for half an hour, the organic phase was separated and dried over magnesium sulfate at 0°C. After filtration, trimethylhydrazine (2.6 g) was added to the filtrate at −15°C. The solution was kept at 0°C for two hours and evaporated in vacuo. The residue was distributed between diluted hydrochloric acid (200 ml) with a pH of about 2.5 and ether (100 ml). The aqueous phase was separated, made alkaline to a pH of about 7.5 and extracted with ether. The ethereal phase was extracted twice with water, dried, and evaporated in vacuo to leave an oil which did not crystallize.

EXAMPLE 19

Pivaloyloxymethyl 6-(α-trimethylhydrazino-ethylideneamino)-penicillanate

By following the procedure of Example 14 and replacing carboxymethyl dithiophenylacetate by carboxymethyl dithioacetate, the product was obtained as an oil which did not crystallize.

EXAMPLE 20

Benzyl 6-trimethylhydrazinomethyleneaminopenicillanate hydrochloride

By following the procedure of Example 1 and replacing pivaloyloxymethyl 6-aminopenicillanate by benzyl 6-aminopenicillanate, the compound was obtained as an amorphous powder.

EXAMPLE 21

6-Trimethylhydrazinomethyleneaminopenicillanic acid hydrochloride

A solution of benzyl 6-trimethylhydrazinomethyleneaminopenicillanate hydrochloride (2.2 g) in methanol (100 ml) was hydrogenated with palladium on charcoal (10%, 2.2 g) at room temperature and under one atmosphere of hydrogen. After the completion of the hydrogenation, the catalyst was filtered off and the filtrate evaporated in vacuo.

The crude hydrochloride was pufified by crystallization from ethanol-diisopropyl ether.

EXAMPLE 22

Pivaloyloxymethyl 6-[(N′-benzyl-N,N′-dimethylhydrazino)-methyleneamino]-penicillanate nitrate By following the procedure of Example 1 and replacing trimethylhydrazine with 1-benzyl-1,2-dimethylhydrazine the compound was obtained as an amorphous powder.

What we claim is:
1. A compound of the formula I

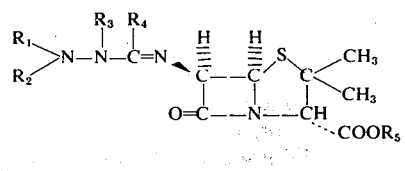

in which $R_1$, $R_2$ and $R_3$ each represents a lower alkyl radical optionally being substituted with phenyl, a lower alkenyl radical, an acetyl, phenylacetyl or a carbamyl radical; $R_2$ further being represented by hydrogen in case that $R_1$ stands for acetyl or phenylacetyl; each of the radicals $R_1$ to $R_4$ also can together with one or more of the other radicals and any nitrogen atoms to which they are attached represent a ring system selected from the group consisting of pyrazolinyl, pyrazolidinyl,1,2,3,6-tetrahydropyridazinyl, 1,4,5,6-tetrahydropyridazinyl, hexahydropyridazinyl, piperidyl, morpholinyl, hexahydro-1H-azepin-lyl and hexahydro-1(2H)-azocinyl; $R_4$ represents hydrogen, methyl optionally substituted with phenyl or phenoxy, a phenyl radical optionally being chloro substituted, and a thienyl radical; $R_5$ represents hydrogen or lower alkyl or lower alkyl substituted with phenyl or lower alkanoyloxy or a salt thereof with a pharmaceutically acceptable acid.

2. Pivaloyloxymethyl 6-trimethylhydrazinomethyleneamino-penicillanate, or a salt thereof with a pharmaceutically acceptable acid.
3. Pivaloyloxymethyl 6-[(N-allyl-N′,N′-dimethylhydrazino)-methyleneamino]-penicillanate, or a salt thereof with a pharmaceutically acceptable acid.
4. Pivaloyloxymethyl 6-[(N-benzyl-N′,N′-dimethylhydrazino)-methyleneamino]-penicillanate, or a salt thereof with a pharmaceutically acceptable acid.
5. Pivaloyloxymethyl 6-[(N′-acetyl-N-isopropylhydrazino)-methyleneamino]-penicillanate, or a salt thereof with a pharmaceutically acceptable acid.
6. Pivaloyloxymethyl 6-[(N′-carbamyl-N,N′-dimethylhydrazino)-methyleneamino]-penicillanate, or a salt thereof with a pharmaceutically acceptable acid.
7. Pivaloyloxymethyl 6-[(5-methyl-2-pyrazolin-1-yl)-methyleneamino]-penicillanate, or a salt thereof with a pharmaceutically acceptable acid.
8. Pivaloyloxymethyl 6-[(N-(hexahydro-1H-azepin-1-yl)-ethylamino)-methyleneamino]-penicillanate, or a salt thereof with a pharmaceutically acceptable acid.
9. Pivaloyloxymethyl 6-[(N′-phenylacetyl-N-isopropylhydrazino)-methyleneamino]-penicillanate, or a salt thereof with a pharmaceutically acceptable acid.
10. A method for producing a compound according to claim 1, in which a 6-aminopenicillanic acid derivative of the general formula II:

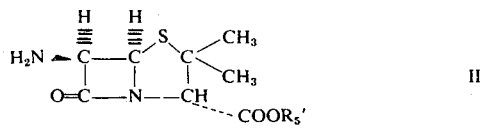

in which $R_5′$ is as defined above for $R_5$ or stands for a trialkylsilyl radical, e.g. a trimethylsilyl radical, is reacted with a compound of the formula III:

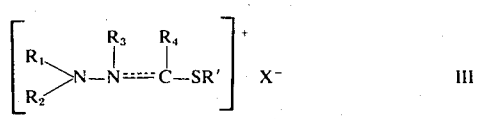

in which $R_1$, $R_2$, $R_3$ and $R_4$ are as defined above, $R'$ is a lower alkyl radical and X is a good leaving group, the reaction optionally being followed by a cleavage, under mild conditions, to form the corresponding free acid of formula I ($R_5$=hydrogen).

* * * * *